United States Patent
Alur et al.

(10) Patent No.: US 9,110,577 B1
(45) Date of Patent: Aug. 18, 2015

(54) METHOD AND SYSTEM FOR CAPTURING, INFERRING, AND/OR NAVIGATING DEPENDENCIES BETWEEN MASHUPS AND THEIR DATA SOURCES AND CONSUMERS

(75) Inventors: Deepak Alur, Fremont, CA (US); Rajmohan Krishnamurthy, Walnut Creek, CA (US); Uday Nandigam Gajendar, Menlo Park, CA (US); Kishore Subramanian, Sunnyvale, CA (US)

(73) Assignee: Software AG USA Inc., Reston, VA (US)

( * ) Notice: Subject to any disclaimer, the term of this patent is extended or adjusted under 35 U.S.C. 154(b) by 644 days.

(21) Appl. No.: 12/890,224

(22) Filed: Sep. 24, 2010

Related U.S. Application Data

(60) Provisional application No. 61/247,155, filed on Sep. 30, 2009.

(51) Int. Cl.
*G06F 3/01* (2006.01)
*G06F 3/0485* (2013.01)
*G06F 3/0482* (2013.01)
*G06F 3/00* (2006.01)
*G06F 3/0481* (2013.01)

(52) U.S. Cl.
CPC ............ *G06F 3/0485* (2013.01); *G06F 3/0482* (2013.01); *G06F 3/0481* (2013.01)

(58) Field of Classification Search
USPC ................. 715/830, 841, 772, 738, 734, 736; 717/106, 109
See application file for complete search history.

(56) References Cited

U.S. PATENT DOCUMENTS

| | | | |
|---|---|---|---|
| 4,914,586 A * | 4/1990 | Swinehart et al. | ..................... 1/1 |
| 6,119,135 A | 9/2000 | Helfman | |
| 6,674,447 B1 | 1/2004 | Chiang et al. | |
| 6,684,207 B1 | 1/2004 | Greenfield et al. | |
| 6,760,306 B1 * | 7/2004 | Pan et al. | ....................... 370/230 |
| 7,149,982 B1 | 12/2006 | Duperrouzel et al. | |
| 7,536,413 B1 | 5/2009 | Mohan et al. | |
| 7,788,251 B2 | 8/2010 | Carlson et al. | |
| 7,831,559 B1 | 11/2010 | Mohan et al. | |
| 7,904,818 B2 | 3/2011 | Lauridsen et al. | |
| 8,321,792 B1 | 11/2012 | Alur et al. | |
| 8,397,056 B1 | 3/2013 | Malks et al. | |
| 8,458,596 B1 * | 6/2013 | Malks et al. | ................... 715/742 |
| 2001/0028368 A1 | 10/2001 | Swartz et al. | |
| 2002/0178119 A1 | 11/2002 | Griffin et al. | |
| 2003/0117437 A1 | 6/2003 | Cook et al. | |
| 2003/0197726 A1 | 10/2003 | Weitzman | |
| 2004/0183831 A1 | 9/2004 | Ritchy et al. | |

(Continued)

OTHER PUBLICATIONS

Office Action issued by the U.S. Patent Office on Dec. 22, 2011 in connection with related U.S. Appl. No. 12/763,798.

(Continued)

*Primary Examiner* — Amy Ng
*Assistant Examiner* — Toan Vu
(74) *Attorney, Agent, or Firm* — Posz Law Group, PLC

(57) ABSTRACT

A computer system, includes a display interface; a user input device interface; and a processor cooperatively operable with the display interface and the user input device interface. The processor is configured to interacting with a user to selectively browse, via the user input device interface and the display interface, relationship dependencies between a selected mashup or service and mashup assets one level removed from the selected mashup or service.

14 Claims, 7 Drawing Sheets

(56) References Cited

U.S. PATENT DOCUMENTS

| | | | |
|---|---|---|---|
| 2004/0207659 A1* | 10/2004 | Goodman et al. | 345/762 |
| 2004/0221296 A1 | 11/2004 | Ogielski et al. | |
| 2005/0166180 A1* | 7/2005 | Lemon et al. | 717/106 |
| 2005/0278323 A1 | 12/2005 | Horvitz et al. | |
| 2007/0028162 A1* | 2/2007 | Griffin et al. | 715/513 |
| 2007/0067722 A1 | 3/2007 | Ames et al. | |
| 2007/0112955 A1 | 5/2007 | Clemm et al. | |
| 2007/0130541 A1 | 6/2007 | Louch et al. | |
| 2007/0162850 A1 | 7/2007 | Adler et al. | |
| 2007/0162936 A1* | 7/2007 | Stallings et al. | 725/58 |
| 2007/0240063 A1 | 10/2007 | Cheng et al. | |
| 2007/0282673 A1* | 12/2007 | Nagpal et al. | 705/11 |
| 2008/0016232 A1 | 1/2008 | Yared et al. | |
| 2008/0034314 A1 | 2/2008 | Louch et al. | |
| 2008/0215675 A1 | 9/2008 | Kaminitz et al. | |
| 2008/0222599 A1* | 9/2008 | Nathan et al. | 717/107 |
| 2008/0270929 A1* | 10/2008 | Bohn et al. | 715/772 |
| 2009/0172545 A1* | 7/2009 | Yokoi | 715/721 |
| 2009/0205029 A1* | 8/2009 | Noda et al. | 726/6 |
| 2009/0259631 A1* | 10/2009 | Farrell et al. | 707/3 |
| 2009/0265362 A1 | 10/2009 | Parsons et al. | |
| 2009/0313601 A1* | 12/2009 | Baird et al. | 717/106 |
| 2009/0328137 A1* | 12/2009 | Liang et al. | 726/1 |
| 2009/0328205 A1 | 12/2009 | Ims et al. | |
| 2010/0034258 A1* | 2/2010 | Pandit et al. | 375/240.08 |
| 2010/0036814 A1* | 2/2010 | Kalasapur et al. | 707/3 |
| 2010/0042973 A1 | 2/2010 | Anderson et al. | |
| 2010/0070925 A1* | 3/2010 | Einaudi et al. | 715/830 |
| 2010/0082989 A1 | 4/2010 | Bussard et al. | |
| 2010/0180254 A1* | 7/2010 | Petschnigg et al. | 717/105 |
| 2010/0180330 A1* | 7/2010 | Zhu et al. | 726/10 |
| 2010/0269149 A1 | 10/2010 | Lee et al. | |
| 2010/0325557 A1* | 12/2010 | Sibillo | 715/751 |
| 2011/0041069 A1* | 2/2011 | Carletti | 715/738 |
| 2011/0191786 A1* | 8/2011 | Ma et al. | 719/320 |

OTHER PUBLICATIONS

Office Action mailed by the U.S. Patent Office on Dec. 30, 2011 in connection with related U.S. Appl. No. 12/763,724.

Office Action issued by the U.S. Patent Office on Jan. 9, 2012 in connection with related U.S. Appl. No. 12/763,517.

U.S. Appl. No. 13/759,632, filed Feb. 5, 2013, Malks et al.

Magazinius et al., "A Lattice-based Approach to Mashup Security", Apr. 2012, pp. 15-23.

Final Office Action issued by the U.S. Patent Office on Dec. 18, 2012 in connection with related U.S. Appl. No. 12/763,517.

Notice of Allowance issued by the U.S. Patent Office on Dec. 26, 2012 in connection with related U.S. Appl. No. 12/763,582.

Notice of Allowance issued by the U.S. Patent Office on Mar. 6, 2013 in connection with related U.S. Appl. No. 12/763,517.

Office Action issued by the U.S. Patent Office on Jun. 8, 2012 in connection with related U.S. Appl. No. 12/763,582.

Office Action issued by the U.S. Patent Office on Aug. 8, 2012 in connection with related U.S. Appl. No. 12/763,517.

Notice of Allowance issued by the U.S. Patent Office on Aug. 8, 2012 in connection with related U.S. Appl. No. 12/763,798.

* cited by examiner

FIG. 2

METHOD AND SYSTEM FOR CAPTURING, INFERRING, AND/OR NAVIGATING DEPENDENCIES BETWEEN MASHUPS AND THEIR DATA SOURCES AND CONSUMERS

CROSS-REFERENCE TO RELATED APPLICATION

This application claims the benefit of the following Provisional application: 61/247,155 filed Sep. 30, 2009, which is expressly incorporated herein by reference.

TECHNICAL FIELD

The technical field relates in general to computer networks, and more specifically to mashups and capturing, inferring, and analyzing mashup meta-data for mashup dependencies.

BACKGROUND

Mashups are created by combining data from different types of data sources including web service, databases, web sites, applications, and data syndication feeds. Once mashups are produced, they are made accessible to users via a Rich Interface Application or a widget.

There are a number of dependencies between mashups, services, applications, data sources, widgets and users. These dependencies are important in the mashup platform because it affects the mashup platform in several ways:
Mashup Trust
Mashup Security
Mashup Integrity

SUMMARY

Accordingly, one or more embodiments provides a computer system, a computer-readable non-transitory medium, and/or a method. The embodiments can provide for a display interface; a user input device interface; and a processor cooperatively operable with the display interface and the user input device interface. The processor can interact with a user to selectively browse, via the user input device interface and the display interface, relationship dependencies between a selected mashup or service and mashup assets one level removed from the selected mashup or service.

One or more embodiments can store the list of services and mashups used by each mashup in a database, and use the database to browse from the selected mashup or service to the mashup assets one level removed.

Still other embodiments can introspect a mashup to discovery data sources directly and indirectly used by the mashup.

Still further embodiments include introspecting the selected mashup to determine whether the selected mashup is directly or indirectly used by at least one other mashup, and disposing of the selected mashup when no other mashup directly or indirectly uses the selected mashup so as to not dispose of mashups which are at least indirectly used by other mashups.

Further embodiments can determine that a user has permission use to the selected mashup which has dependencies, when each of the dependencies of the mashup all allow the user permission to use the each dependency, and determine that the user does not have permission to use the selected mashup when one of the dependencies of the mashup does not allow the user permission even though the selected mashup allow the user permission.

Still other embodiments can include a browser user interface which presents the selected mashup in a focus window, "used by" relationships of the selected mashup in a "used by" window, and "uses" relationships of the selected mashup in a "uses" window. This still other embodiments can support selectively switch the focus window to a different selected mashup in one of the "used by" window or the "uses" window, in response to a user command thereto.

According to yet another embodiment, a mashup system can include the above computer system (or method) acting as a mashup client, and a mashup server cooperatively connected to and in communication with the mashup client, to coordinate access to the relationship dependencies from the mashup client through the mashup server.

Still other embodiments provide for a method for the foregoing, and/or a non-transitory computer-readable medium with instructions thereon which, when executed, perform the foregoing.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles.

FIG. 2 is an example user interface illustrating mashup dependency relationships: uses and use by relations.

DETAILED DESCRIPTION

Figure 1:
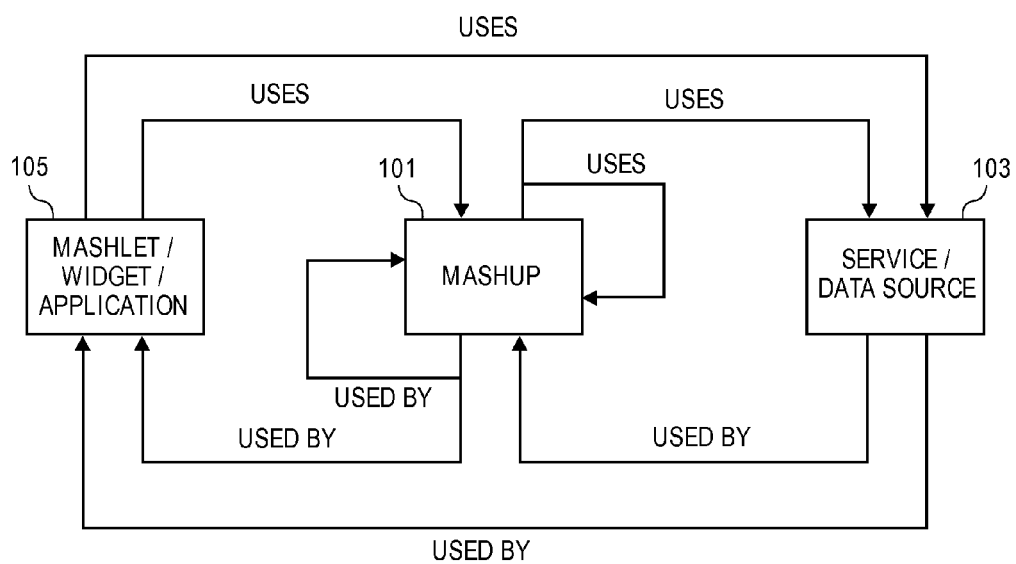
FIG. 1 is an illustration of mashup dependency relationships: uses and used-by relations.

In overview, the present disclosure concerns computer systems, sometimes referred to as client/server networks, such as may be associated with providing mashups. Such computer systems often involve running a mashup on a user's computer that combines data from different data sources and that communicates as a client with a mashup server that invokes the desired web service specified by the mashup, the web service providing live data to the user through the mashup client/server, so that the live data can be used according to the mashup without regard to user interface formatting specified by the web service, with the data sources and/or mashups sometimes being dependent on each other for trustworthiness, security, and/or integrity. More particularly, various inventive concepts and principles are embodied in systems, devices, and methods therein for capturing, inferring, and/or navigating dependencies between mashups and the mashup data sources and consumers of the mashups.

The computer systems of particular interest are those providing or facilitating mashups over communication networks involving a mashup server and a user's computer, and the like, and variants or evolutions thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to facilitate easier and powerful ways to analyze mashups and their dependencies by capturing and inferring dependency relationships between mashups, services, data source, MASHLET™ components, widgets, applications and users. (MASHLET™ refers to a type of a mashup, and is commercially available from JackBe Corporation.)

The Mashup Dependency System (MDS) discussed further herein can capture information about mashups and relationships between mashups and various artifacts. Using these relationships, the platform can facilitate the following:

1. Mashup Trust: A mashup is only as trust-worthy as the services and data it is combining. So as a user, it is important to know what the pedigree of a Mashup by introspecting the mashup to understand what data sources are being used. Without the mashup dependency system, it is not possible to provide this information to the mashup user.

2. Mashup Security: Mashups are only as secure as the data sources. If a user needs access to a mashup, but does not have permission to access the underlying data source, then the user should not be granted access to a mashup. Without the mashup dependency system, it is not possible to make this determination.

3. Mashup integrity means once a mashup is put into use, the system cannot arbitrarily dispose of an asset that the mashup depends upon. For example, if a mashup is using a web service that is published in the mashup platform, this implies that the mashup is dependent on the existence of that web service. If the owner of that web service needs to decommission that service, they need to know that the service is currently being used by that mashup and therefore there is a consequence to removing that service. Without the mashup dependency system, it is not possible to make this determination.

Referring now to FIG. 1, an illustration of mashup dependency relationships: uses and used-by relations will be discussed and described. FIG. 1 shows the relationships between the different types of artifacts in the Mashup, particularly, the artifacts that "use" other artifacts. In this illustration, if a first artifact "uses" a second artifact, the second artifact is "used by" the first artifact. A mashup 101 is deemed to "use" the information from an information-providing service 103, such as a mashup that uses Google maps information whether the mashup obtains the information directly from Google maps or from an intervening mashup that obtained the information from Google maps.

FIG. 1 illustrates an artifact which is a mashup 101, an artifact which is a service 103 (labeled as "service/data source"), and an artifact which is a mashup 105 (labeled as "mashlet/widget/application").

The mashup 101 uses itself, and is used by itself, as reflected in FIG. 1 by arrows labeled "uses" and "used by" to and from the mashup 101 (only).

The mashup 101 uses the service/data source 103. Therefore, the service/data source 103 is used by the mashup 101. Also, the mashlet/widget/application 105 uses the mashup 101. Therefore, the mashup 101 is used by the mashlet/widget/application 105. Each of these relationships are direct; that is, there is no intervening mashup which passes the data through.

The mashlet/widget/application 105 uses the service/data source 103, and therefore service/data source 103 is used by the mashlet/widget/application 105. This relationship is indirect. That is, the mashup/widget/application may use data from the service/data source 103; however, the data is obtained through the intervening mashup 101.

In the mashup trust example given above, the user of the mashlet/widget/application 105 knows that the data is trustworthy (or not), not because it is from mashup 101, but because the data is originally provided from service/data source 103 which is trustworthy (or not) and the intervening mashup 101 is also trustworthy.

In the mashup security example given above, if the user of the mashup 101 does not have permission to access the service/data source 103 mashlet/widget/application 105, then the same user of mashlet/widget/application 105 should not be able to access the mashup 101 (or the relevant part thereof) which provides data from the service/data source 103.

In the mashup integrity example given above, even if the mashup 101 is no longer operating, the service/data source 103 will still be used by the mashlet/widget/application 105. Simply determining whether the calling mashup 101 with the direct relationship still calls the service/data source 103 will be insufficient to determine whether the service/data source 103 can be decommissioned.

Mashup Dependencies APIs:

The Mashup Dependency System can provide a rich set of APIs for the applications, users and user interfaces to leverage to ensure that the mashup platform can provide trustworthy, secure mashups and allow users to ensure mashup data integrity.

There are two types of dependency APIs: (1) relationship APIs and (2) security APIs.

Examples of these APIs are listed below:

Relationships APIs:

1. Get list of Services used by a Mashup (first level and recursively). The reference to "first level" means that a single level (left and right in the illustration) is checked at a time. The reference to "recursively" means that all of the levels are checked, such that a network of objects connected by links is checked. In this example, the relationship API to Get list of Services used by a Mashup (first level) checks a single level that uses the Mashup, and a single level that is used by the Mashup, and gets a list of those services. The "recursive" Get list performs this recursively on all levels. With this explanation, the following generally should be understood.

2. Get list of Mashups used by a Mashup (first level and recursively)

3. Get list of Services and Mashups used by a Mashup (first level and recursively)

4. Get list of Mashups used by a MASHLET™ component (first level and recursively)

5. Get list of Services used by a MASHLET™ component (first level and recursively)

6. Get list of Mashups and Services used by a MASHLET™ component (first level and recursively)

Security Dependencies APIs:

By way of background, a mashup can have securities, such as permission which can be, e.g., user level or group-based, etc. A particular example is that a user can be granted various permissions to perform actions such as access to the mashup, and/or the user may or may not be granted permission to receive data used by the mashup. A mashup can allow, for example, the existing permission schemes to be used. The existing permission scheme can be provided as a separate security repository, and/or can be checked. A security policy can provide for granting permissions, and when those permissions are granted can check for conflicts by using relationship APIs.

For the purpose of this application, a "service" refers to, e.g., a web service, or customer proprietary data exposure service.

1. Check if a user has permission to use a given Mashup (by traversing the relationships using a relationship API)

2. Check if a group of users have permission to use a given Mashup (traverse the relationships)

3. Grant permission to a user or group of users to a Mashup (traverse relationships to check if a dependent artifact does not permit this user or group the required permission)

4. Revoke permission to a user or a group of users to a Mashup

5. Check if a user has permission to use a given MASHLET™ component (traverse the relationships)

6. Check if a group of users have permission to use a given MASHLET™ component (traverse the relationships)

7. Grant permission to a user or group of users to a MASHLET™ component (traverse relationships to check if a dependent artifact does not permit this user or group the required permission)

8. Revoke permission to a user or a group of users to a MASHLET™ component

Figure 2:
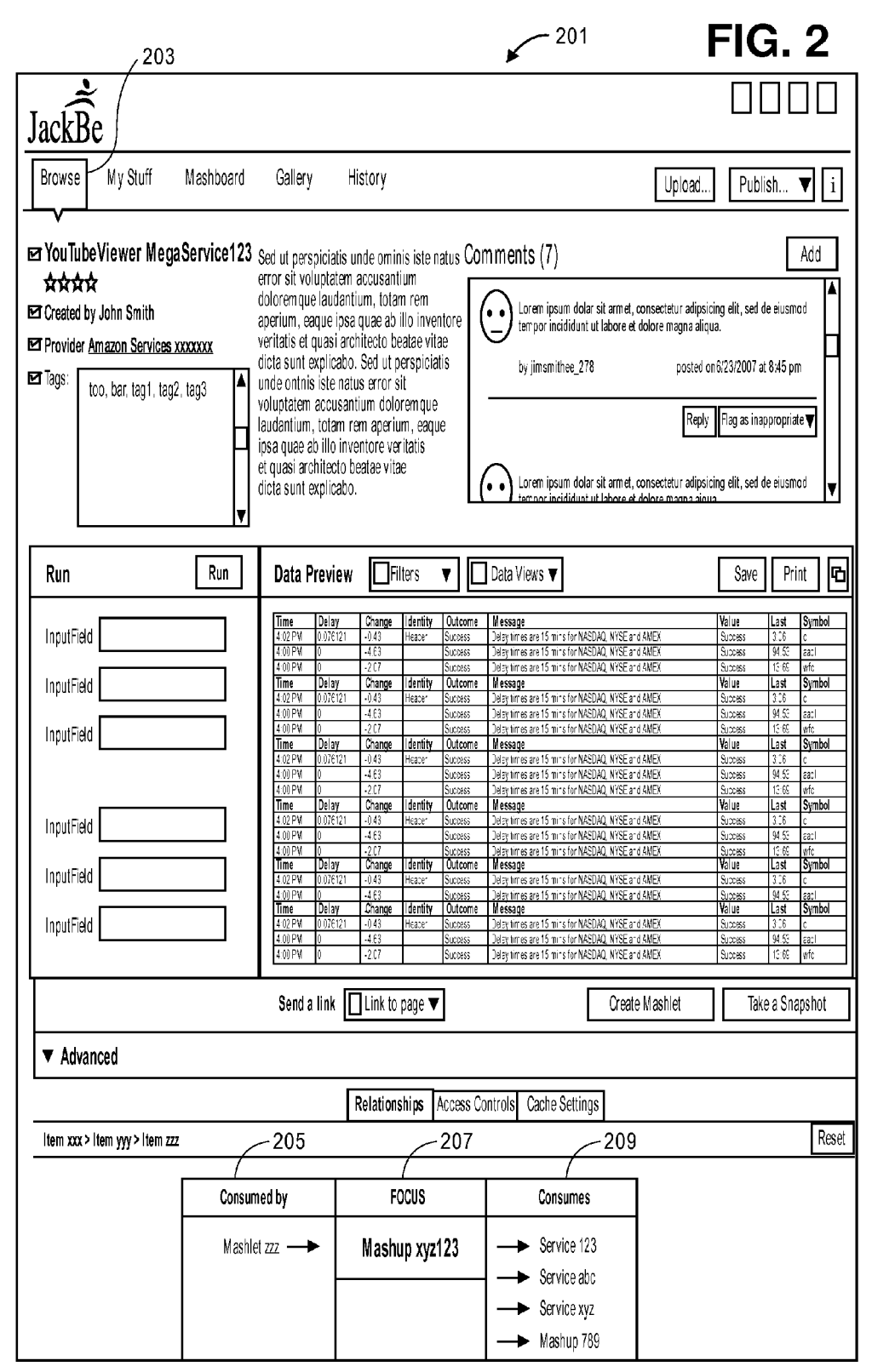

Referring now to FIG. 2, an example user interface 201 illustrating mashup dependency relationships: uses and used by relations will be discussed and described. In this illustration, the user interface 201 provides a "browse" function that interacts with a user to allow the user to traverse the dependency relationships. Illustrated in the user interface 201 is a "focus" 207 of the browser, the "consumed by" relationships 205 (also referred to as "used by", and the "consumes" 209 relationship (also referred to as "uses").

The diagram in FIG. 2 shows one way the relationships data can be leveraged in the mashup platform to display the inter-dependencies between the artifacts. In this case, the user is looking at the details of a service and the dependencies of that service on other artifacts within the mashup platform.

Here, the service Mashup xyz123 is the focus 207 of the browser. The "consumes" 209 column lists the services which the focus 207 uses. The "consumed by" 205 column lists the services which use the focus 207. In this user interface 201, the browser illustrates the focus 207 and one left and one right relationship. Other browser can be provided which list two or more left and/or right relationships for the focus 207.

Mashup Dependency Browser:

The Mashup Dependency System provides a rich set of APIs for the applications, users and user interfaces to leverage to ensure that the mashup platform can provide trustworthy, secure mashups and allow users to ensure mashup data integrity. The APIs were described above. Using these APIs, the Presto mashup platform provides for a rich interface to navigate different artifacts and their inter-relationships. This interface is called Mashup Dependency Browser.

FIG. 3 through FIG. 7 illustrate how the dependency browser can focus on a set of "uses" and "used by" relationships with a single artifact at the center. FIG. 3 through FIG. 7 are a simplified illustration of sequentially shifting the focus of the browser, a single level at a time.

The MDB can be opened by focusing on any artifact in the mashup platform. For instance, FIG. 3 puts the focus on Mashup 1. When Mashup 1 is selected as the focal point, the browser shows all the other artifacts used by Mashup 1 and all the other artifacts Mashup 1 uses.

Now, when the user selects one of the other artifacts shown in the browser, the focus shifts to that artifact and the browser display changes according to the newly discovered relationships. For instance, FIG. 3 and FIG. 4 show the browser with the focus on Mashup 1 shifting to Mashup 2.

Figure 3:
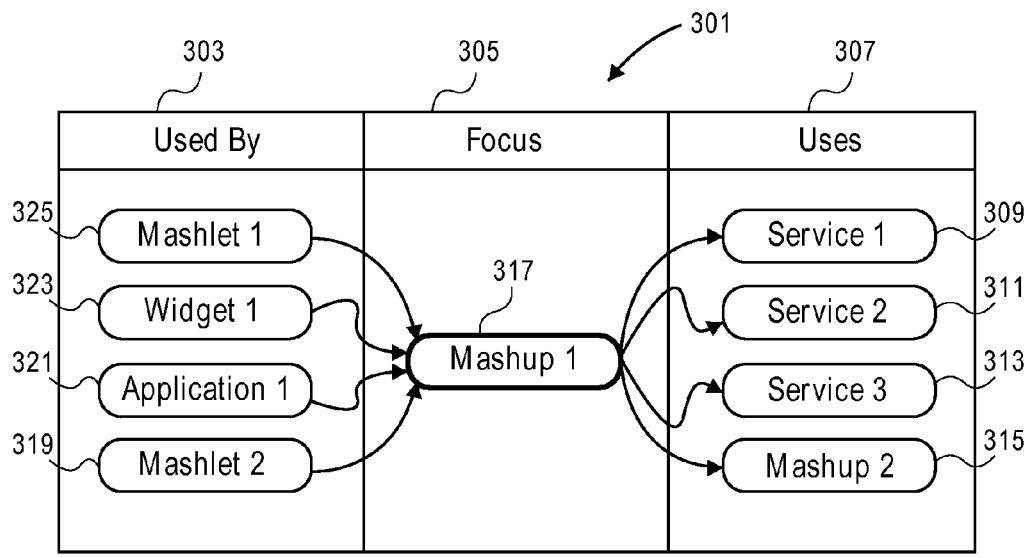
FIG. 3 is an illustration of mashup dependency browser, with mashup 1 in focus.
Figure 4:
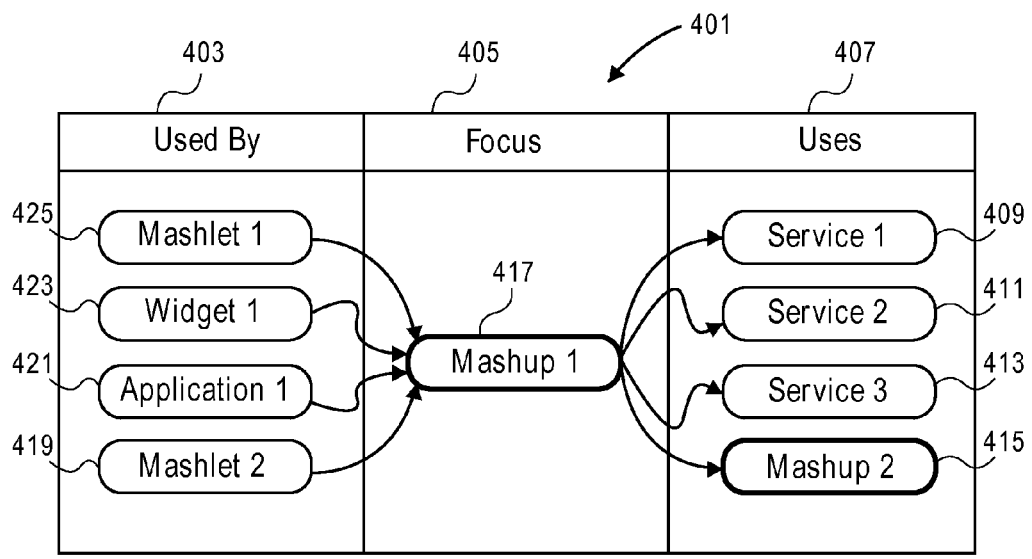
FIG. 4 is an illustration of a mashup dependency browser, when the user selects mashup 2.

Referring now to FIG. 3, an illustration of mashup dependency browser, with mashup 1 in focus will be discussed and described. In this user interface 301, there is provided a "focus" window 305, a "used by" window 303, and a "uses" window 307. The "used by" window 303 lists the mashlets/widgets/applications that directly call the focus, i.e., mashup 1 317. The "uses" window 307 lists the services/data sources which the focus 305 uses. Here, ashup 1 317 uses service 1, service 2, service 3, and mashup 2 309, 311, 313, 315; and mashup 1 317 is used by mashlet 1, widget 1, application 1 and mashlet 2 319, 321, 323, 325.

The user can interact with the user interface 301, 401 to select one of the listed artifacts. Referring now to FIG. 4, an illustration of a mashup dependency browser, when the user selects mashup 2 will be discussed and described. Here, the same artifacts are illustrated as in FIG. 3. The "uses" window 407 lists the services/data sources which the focus 405 uses. Here, mashup 1 417 uses service 1, service 2, service 3, and mashup 2 409, 411, 413, 415; and mashup 1 417 is used by mashlet 1, widget 1, application 1 and mashlet 2 419, 421, 423, 425.

Because the uses selects "mashup 2" such as by clicking in the user interface, the focus 405 will shift to change mashup 2 415 to become the focus 405.

Figure 5:
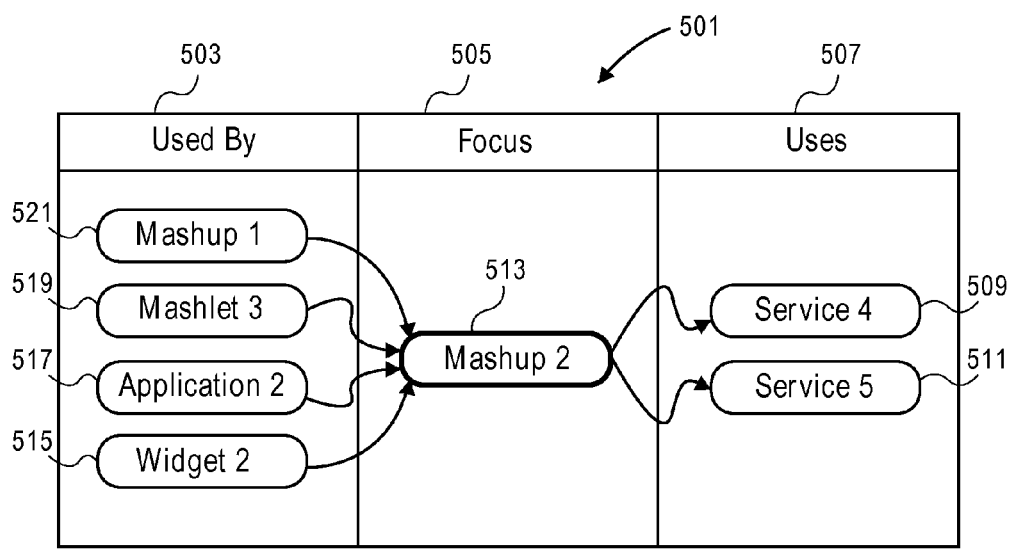
FIG. 5 is an illustration of a mashup dependency browser, when the browser puts mashup 2 in focus and shows its relationships.

Referring now to FIG. 5, an illustration of a mashup dependency browser, when the browser puts mashup 2 in focus and shows its relationships will be discussed and described. Here, the same artifacts from the "focus" window and the "uses" window are illustrated as in FIG. 4. However, the "uses" window 507 lists the services/data sources which the focus 505 (now changed to mashup 2) uses. Here, mashup 2 513 uses service 4 and service 5 509, 511; and mashup 2 513 is used by mashup 1, mashlet 3, application 2, and widget 2 515, 517, 519, 521. Because mashup 2 513 is now the focus 505, the "used by" 503 relationship are different. Instead of merely shifting the "focus" window with the same artifacts to the left, the browser discovers the "used by" and "uses relationships of the artifact newly listed in the "focus" window.

Now, when the user selects another artifact shown in the browser, the focus shifts to that artifact and the browser display changes according to the newly discovered relationships. For instance, FIG. 6 and FIG. 7 show the same example browser with the focus shifting from mashup 2 to MASHLET™ component 3 (which is a "used by" artifact).

Figure 6:
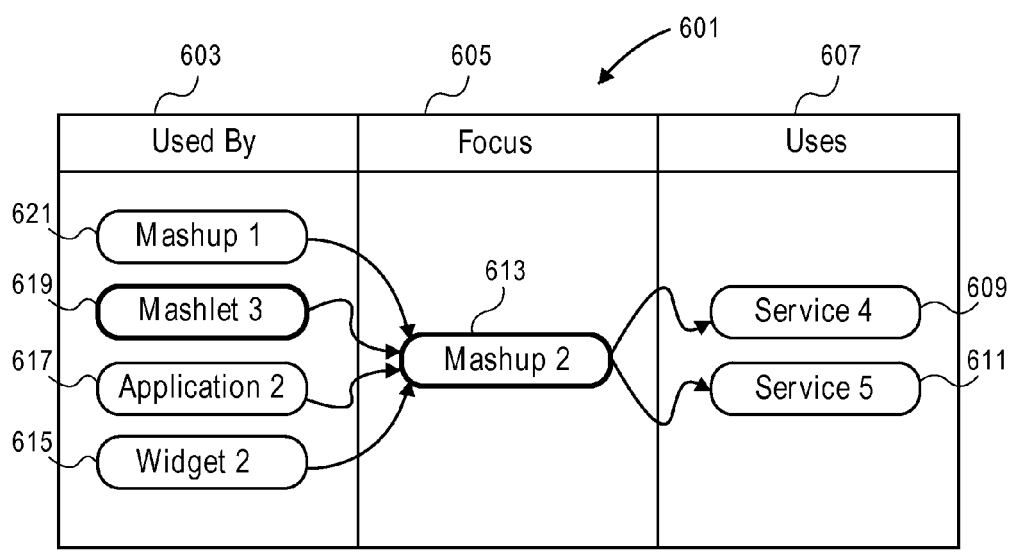
FIG. 6 is an illustration of a mashup dependency browser, when the user selects MASHLET™ component 3.

Referring now to FIG. 6, an illustration of a mashup dependency browser, when the user selects MASHLET™ component 3 will be discussed and described. Here, artifacts are repeated from FIG. 5. The "uses" window 607 lists the services/data sources which the focus 605 uses. Here, mashup 2 613 uses service 4 and service 5 609, 611; and mashup 2 613 is used by mashup 1, mashlet 3, application 2, and widget 2 615, 617, 619, 621.

Figure 7:
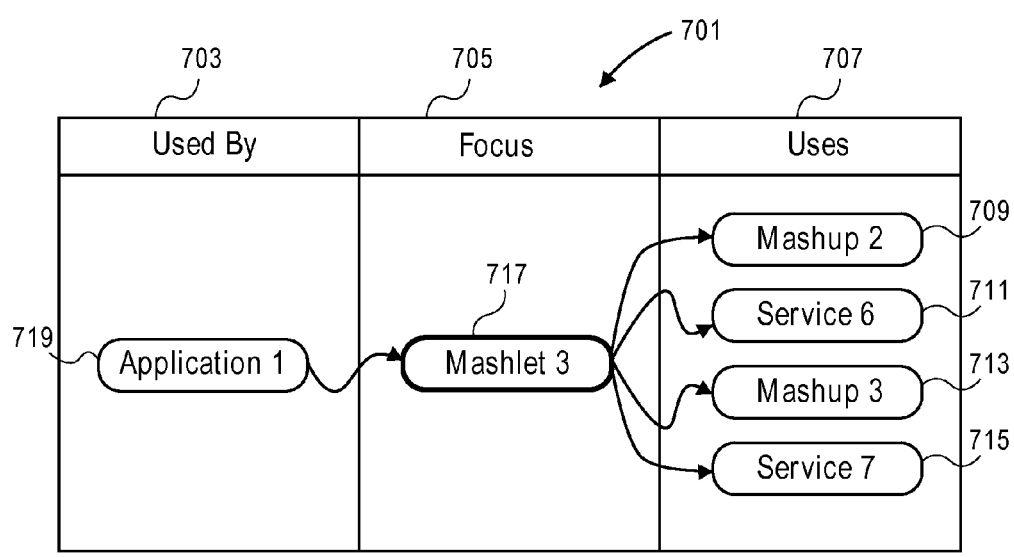
FIG. 7 is an illustration of a mashup dependency browser, when the browser puts mashup 2 in focus and shows its relationships.

Because the uses selects "mashlet 3" such as by clicking in the user interface, the focus 605 will shift to change mashlet 3 619 to become the focus 605, as shown in FIG. 7.

Referring now to FIG. 7, an illustration of a mashup dependency browser, when the browser puts mashlet 3 717 in focus 705 and shows its relationships will be discussed and described. Here, the same artifacts from the "focus" window and the "uses" window are illustrated as in FIG. 6, to further illustrate the shift in the focus window of the user interface 701. However, the "uses" window 707 lists the services/data sources which the focus 705 (now changed to mashlet 3 717) uses. Here, mashlet 3 717 uses mashup 2, service 6, mashup 3, and service 7 709, 711, 713, 715; and mashlet 3 717 is used by application 1 719. Because mashlet 3 717 is now the focus 705, the "used by" 703 relationships are different. Instead of merely shifting the "focus" window with the same artifacts to the left, the browser discovers the "used by" and "uses relationships of the artifact newly listed in the focus window 705.

Thus the Mashup Dependency Browser provides a user friendly way of navigating complex relationships between different artifacts in the mashup platform by leveraging the meta-data captured and inferred by the system and the rich APIs exposed by the mashup dependency system.

In a mashup, for example, Presto software (available from JackBe Corporation), the mashup application allows a user to collect data (components) from different sources, and combine them. Content within the mashup describes how the components which are collected are to be combined.

Figure 8:
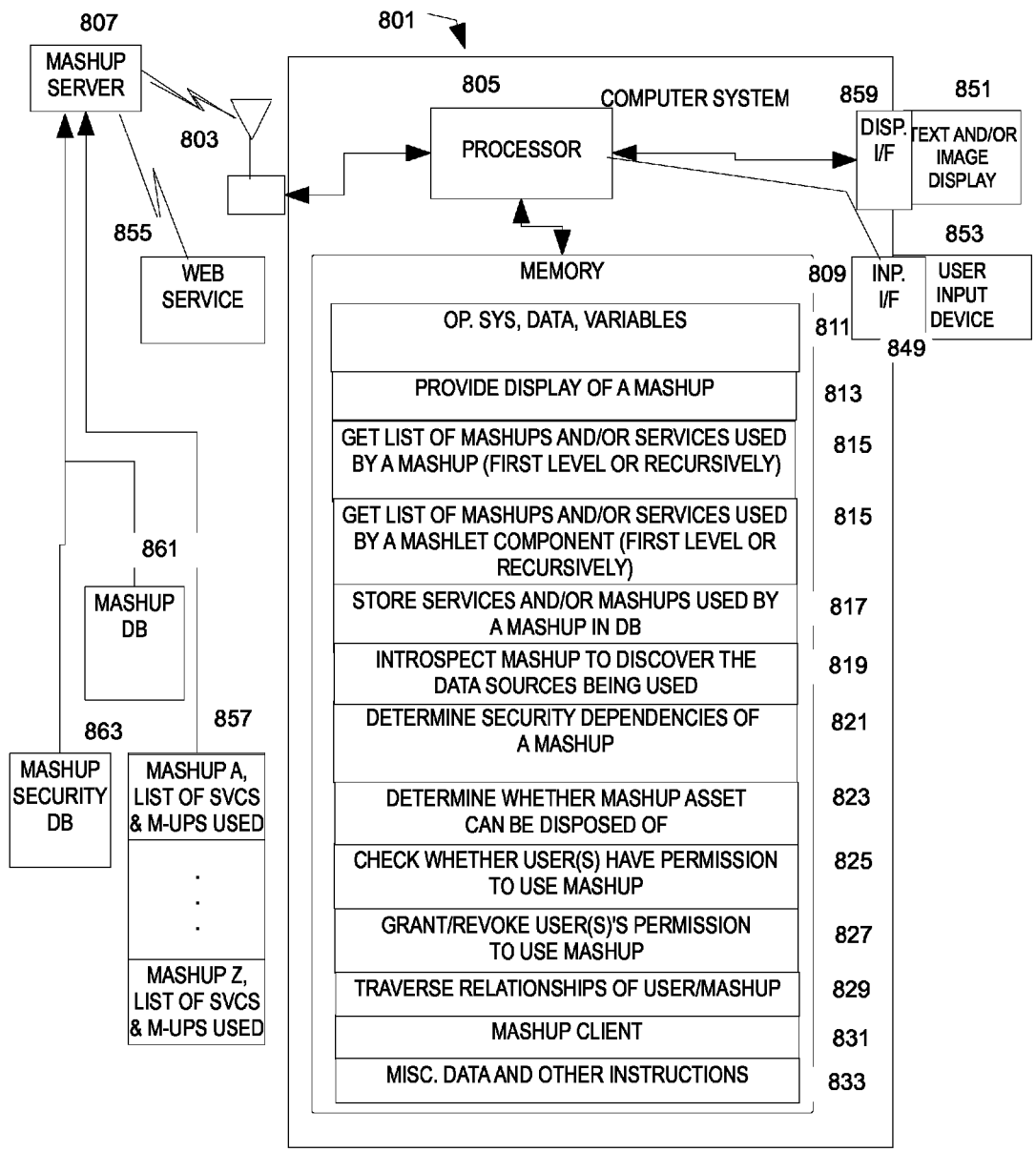
FIG. 8 is a block diagram illustrating portions of an exemplary computer system.

Referring now to FIG. 8, a block diagram illustrating portions of an exemplary computer system will be discussed and described. The computer system 801 may include a communication port and/or transceiver 803 or the like for communication with a mashup server 807, a processor 805, a memory 809, a display interface 859, a display 851, an input interface 861, and/or a user input device 853 such as a keyboard, trackball, mouse, joystick, pointing device, and/or similar.

The mashup server 807 can be a part of a mashup platform comprising the mashup server 807 and a mashup client 831 which can execute on the processor 805 of the computer system 801. Mashup server and mashup client functions can be distributed between the mashup server 807 and the mashup client 842 according to known techniques. The mashup server 807 can invoke one or more web services 855 as an information-providing services as is known to obtain data from a data source. Also, the mashup server 807 can access a mashup security database 863 on which security profiles (such as permissions) associated with each mashup can be stored; and can access a database 857 storing a per-mashup list of services and mashups used; as well as a conventional mashup database 861. The mashup security database 863 and/or the per-mashup list of services database 857 can be incorporated into the mashup database 861.

The processor 805 may comprise one or more microprocessors and/or one or more digital signal processors. The memory 809 may be coupled to the processor 805 and may comprise a read-only memory (ROM), a random-access memory (RAM), a programmable ROM (PROM), and/or an electrically erasable read-only memory (EEPROM). The memory 809 may include multiple memory locations for storing, among other things, an operating system, data and variables 811 for programs executed by the processor 805; computer programs for causing the processor to operate in connection with various functions such as to provide 813 a display of a mashup, to get 815 a list of mashups used by a mashup, to get 817 a list of mashups used by a mashlet component, to store 817 services/mashups used by a mashup in a database, to introspect 819 a mashup so as to discover the data sources being used, to determine 821 security dependencies of a mashup, to determine 823 whether a mashup asset can be disposed of, to check 825 whether user(s) have permission to use a mashup, to grant/revoke 827 permissions to users to use a mashup, to traverse 829 relationships of a user/mashup, a mashup client function 831, and/or other processing; and a database 833 for other information used by the processor 805. The computer programs may be stored, for example, in ROM or PROM and may direct the processor 805 in controlling the operation of the computer system 801. Each of these functions is considered in more detail below.

The user may invoke functions accessible through the user input device 853, interface with the processor 805 through an input interface 849. The user input device 853 may comprise one or more of various known input devices, such as a keyboard and/or a pointing device, such as a mouse; the keyboard may be supplemented or replaced with a scanner, card reader, or other data input device; the pointing device may be a mouse, touch pad control device, track ball device, or any other type of pointing device; and the input interface 849 can be a known interface thereof to communicate with the processor 805.

The text and/or image display 851 is representative of a display that may present information to the user by way of a conventional liquid crystal display (LCD) or other visual display, and/or by way of a conventional audible device for playing out audible messages.

Responsive to signaling from the user input device 853, in accordance with instructions stored in memory 809, or automatically upon receipt of certain information via the communication port and/or transceiver 803, the processor 805 may direct the execution of the stored programs.

The processor 805 can be programmed for providing 813 a display of a mashup and/or a service, such as is performed according to known techniques when a user invokes a service or a mashup. As is known, the invocation of the mashup or service is performed via the mashup platform which comprises the mashup client 831 and the mashup server 807, sometimes requiring the system to interact with the user to input data and select a service or mashup via the user input device 853 and/or display 851, resulting in the mashup or service displaying data generated by the web service 855 which is provided for the display 851.

The processor 805 can be programmed to get 815 a list of mashups and/or services used by a mashup, to a first level or recursively over two or more levels. Similarly, the processor 805 can be programmed to get 817 a list of mashups and/or services used by a mashlet component, to a first level or recursively over two or more levels. The list is provided with respect to a single node, and includes a list of all nodes which are connected, directly or indirectly, as "used by" or "uses" relationships to the single node. Furthermore, the list can indicate the particular relationship, i.e., the "used by" or "uses" relationship, and if not the first level, which level and which nodes connected through.

The processor 805 can be programmed to store 817 a list of the services/mashups used by a mashup in a database. That is, a database can be provided that indicates the direct "used by" relationships for each of the mashups. Here, the database 857 includes a list of services and mashups for Mashup A to Mashup Z. Note that instead of a separate database, this can be incorporated into the conventional mashup database 861.

The processor 805 can be programmed to introspect 819 a mashup so as to discover the data sources being used by a mashup. That is, in response to a selected mashup, the processor 805 can reference the database 857 storing the list of the services/mashups used by a selected mashup. The database 857 can be recursively traversed the predetermined number of one or more levels from the selected mashup to the mashups and services in the list of the selected mashup, to the lists for each of the listed services and mashups, to discover the data sources which are directly and indirectly used by the selected mashup.

The processor 805 can be programmed to determine 821 security dependencies of a mashup. Specifically, in response to a selected mashup, the processor 805 can reference the database 857 storing the list of the services/mashups used by the selected mashup. The processor 805 can reference the mashup security database 863 for the security profile for the selected mashup and the mashups and services in the list of the selected mashup, traversed recursively to the predetermined number of one or more levels away from the selected mashup. Accordingly, the processor 805 can determine, for example, whether a necessary permission is granted to a user or group of users for the mashup and all of its dependencies by reference to the aggregated security profiles for the mashup and all of its dependencies.

The processor 805 can be programmed to determine 823 whether a mashup asset can be disposed of. A mashup asset can be disposed of when no other asset directly or indirectly has a dependency "uses" relationship to the mashup asset. For example, the processor can obtain a list of all nodes which are connected, directly or indirectly, as "uses" relationships to the single node which is to be disposed of. If the list is empty, that is, the selected mashup asset has no "uses" relationship, the selected mashup asset may be disposed of. Known techniques for disposing of an asset may be used.

The processor 805 can be programmed to check 825 whether user(s) have permission to use a mashup. When a user attempts to use a selected mashup, the processor 805 can reference the database 857 storing the list of the services/mashups used by the selected mashup, and the mashup security database 863 for the security profile for the selected mashup and the mashups and services in the list of the selected mashup, traversed recursively to the predetermined number of one or more levels away from the selected mashup. Accordingly, the processor 805 can determine, for example, whether a necessary permission is granted to a user or group of users for the mashup and all of its dependencies by reference to the aggregated security profiles for the mashup and all of its dependencies.

The processor 805 can be programmed to grant/revoke 827 permissions to users to use a mashup. Various known techniques can be utilized to grant or revoke permissions. Also, the permissions can be stored in a security profile for the mashup, such as in the illustrated mashup security database 863.

The processor 805 can be programmed to traverse 829 relationships of a user/mashup. It will be appreciated that the "uses" and "used by" relationships form trees connected by a single node in the middle. The trees may or may not be orderly, since they reflect relationships selected by users. The tree may be traversed left to right, or right to left, as illustrated, or in a similar manner. The traversal can be visualized with a browser, as discussed herein. Alternatively, the traversal information can be used to determine permissions to use mashups, suitability for managing mashup dependencies, or similar.

The processor 305 can be programmed with a mashup client function 831, in accordance with known techniques. That is, the mashup platform can be distributed between the mashup server 807 and the mashup client 829, as is known. Details which are not presently relevant are omitted from the present description.

The computer system 801 can include a central processing unit (CPU) with disk drives (not illustrated), symbolic of a number of disk drives that might be accommodated by the computer. Typically, these might be one or more of the following: a floppy disk drive, a hard disk drive, and a CD ROM or digital video disk. The number and type of drives may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external.

It should be understood that FIG. 8 is described in connection with logical groupings of functions or resources. One or more of these logical groupings may be omitted from one or more embodiments, for example, the functionality of analyzing a trend over time in the aggregated data can be omitted and/or performed on a different processor. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope of the invention.

Figure 9:
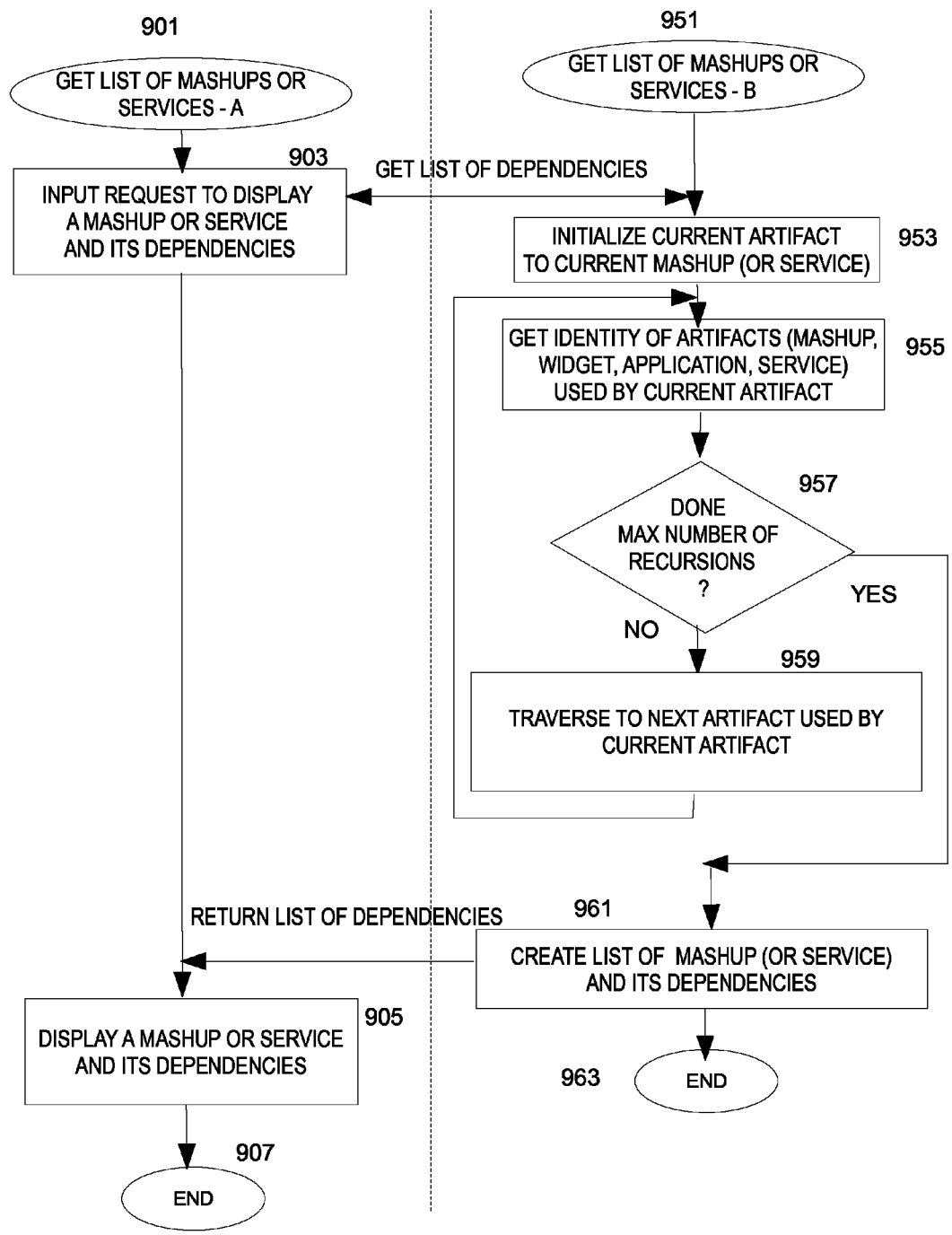
FIG. 9 is a flow chart illustrating a procedure to get a list of mashups or services.

Referring now to FIG. 9, a flow chart illustrating a procedure to get a list of mashups or services will be discussed and described. The procedure can advantageously be implemented on, for example, a processor of a computer system, optionally together with a mashup server, such as described in connection with FIG. 8 or other apparatus appropriately arranged.

In overview, the procedure to track trends conveniently can be distributed in two flows, the first flow get list of mashups or services-A 901 as a user application and the second flow get list of mashups or services-B 951 as a background process.

The first flow 901 can include inputting 903 a request to display a mashup or service and its dependencies. Standard techniques may be used to prepare a user interface that interacts with the user to select an artifact such as a mashup which is to be the focus for the browser. The first flow 901 can then instruct the flow B 951 to obtain the list of dependencies for the selected artifact, and can wait to receive the returned list of dependencies which can then be displayed 905.

The second flow get list of mashups or services B 951 can include, in response to a request to browse a particular mashup or service, initializing 953 a current artifact to the currently selected mashup (or service). The flow B 951 can get the list for a single level of dependencies, that is just one "uses" and one "used by" level directly adjacent to the selected mashup (or service). Alternatively, the flow B 951 can be set to recursively obtain the dependencies to two or more levels, thereby traversing more of the tree left and right. The recursion can be preliminarily set, for example, by indicating a maximum number of recursions to one or more (as desired). To get the list, the flow B 951 gets 955 the identity of all artifacts (mashups, widgets, applications, and/or services) which are used by the current artifact. If 957 the maximum number of recursions has not been reached, the second flow B can traverse 959 to each of the next artifact (left or right) used by the current artifact, and for each of the next artifacts repeat to obtain the identity of the artifacts used thereby.

Accordingly, the second flow B can create 961 a list consisting of the mashup (or service) and its dependencies, that is, the "uses" and "used by" relationships. The second flow B can return the list to the first flow A which can display the list to the user and/or interact with the user for further browsing of dependencies. Once the second flow B is done creating the list of the mashup and its dependencies, the process can end 961. Similarly, once the first flow A is done displaying 905 the mashup or service and its dependencies the process can end 907.

For the purpose of this patent application, a "mashup" is defined as a software application that combines pre-existing components from one or more information-providing services into a single tool which can comprise a server-side and a client-side application, where the components used by the mash-up are visually presented to a user on a display at the client-side in a manner which is different from the pre-determined presentation of the information-providing service; and is configured in accordance with standards such as Enterprise Mashup Markup Language ("EMML"), XML interchanged as REST or Web Services, RSS, Atom, and other evolutions and variations of mashup standards. A mashup is to be distinguished from a portal in which content is presented side-by-side in the manner which is the same as the pre-determined presentation of the information-providing service. The designation "component" as used in this paragraph refers to data which is retrieved by a mashup in real-time from an information-providing service. A mashup is frequently made by access to open APIs and other data sources to produce results that were not the original reason for producing the raw source data. An example of a mashup is the use of cartographic data from Google Maps to add location information to real estate data, thereby creating a new and distinct Web service that was not originally provided by either source.

The designation "MASHLET" used herein refers to type of a mashup that is a client side process that runs in the browser; a MASHLET sometimes can include a widget. A MASHLET is available from JackBe Corporation. The phrase "MASHLET component" refers to a mashup widget which is included in a MASHLET.

The term "service", sometimes referred to herein as an "information-providing service", is used herein expressly to refer to an information-providing service that provides data from a server in a visual presentation on a display to a user, typically an application programming interface (API) or web API that can be accessed over a computer network and executed on a remote system hosting the requested services, in accordance with Extensible Markup Language messages that follow the Simple Object Access Protocol (SOAP) standard such as SOAP Version 1.2 specification, Web Services Description Language (WSDL) such as Web Services Description Language Version 2.0 Specification, Representational State Transfer (REST) constraints, and variations and evolutions thereof. An example of a service is Google Maps, a Web service or an RSS feed.

The term "widget" as used herein is defined to be a stand-alone application which comprises a portable chunk of code that can be installed and executed within a separate HTML-based web page by an end user without requiring additional compilation. A widget frequently is written to use DHTML, JavaScript, or Adobe Flash, variations and evolutions thereof. Widgets often take the form of on-screen tools (clocks, event countdowns, auction-tickers, stock market tickers, flight arrival information, daily weather, etc.).

It should be understood that the invention is described in connection with logical groupings of functions or resources. One or more of these logical groupings may be omitted from one or more embodiments, and still remain within the scope of the present invention. Likewise, functions may be grouped differently, combined, or augmented without parting from the scope of the invention. Similarly the present description may describe various databases or collections of data and information. One or more groupings of the data or information may be omitted, distributed, combined, or augmented, or provided locally and/or remotely without departing from the scope of the invention.

A computer-readable storage medium is tangible and can be any of the memory or disks, such as those examples described above, or other removable or fixed storage medium.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the computer system may be a general purpose computer, or a specially programmed special purpose computer. It may be implemented as a distributed computer system rather than a single computer. Similarly, a communications link may be World Wide Web, a modem over a POTS line, and/or any other method of communicating between computers and/or users. Moreover, the processing could be controlled by a software program on one or more computer system or processors, or could even be partially or wholly implemented in hardware.

Further, the invention is not limited to particular protocols for communication. Any appropriate communication protocol may be used.

One or more displays for the system may be developed in connection with HTML display format. Although HTML is the preferred display format, it is possible to utilize alternative display formats for interacting with a user and obtaining user instructions.

The above discussion has involved particular examples. However, the principles apply equally to other examples and/or realizations. Naturally, the relevant data may differ, as appropriate.

Further, the above has been discussed in certain examples as if made available by a provider to a single customer with a single site. The above described system, device and/or method may be used by numerous users over distributed systems, if preferred.

The above has been described in connection with example data formats, for example XML and/or proprietary or public formats. However, it may be used in connection with other data formats, structured and/or unstructured, unitary and/or distributed.

The system used in connection with various embodiments may rely on the integration of various components including, as appropriate and/or if desired, hardware and software servers, applications software, database engines, server area networks, firewall and SSL security, production back-up systems, and/or applications interface software. The configuration may be, preferably, network-based and optionally utilizes the Internet as an exemplary interface with the user for information delivery.

The various databases may be in, for example, a relational database format, but other standard data formats may also be used. Windows 2007, for example, may be used, but other standard operating systems may also be used. Optionally, the various databases include a conversion system capable of receiving data in various standard formats.

Accordingly, one or more embodiments provide a system, method, device, and/or computer readable storage medium which comprises: providing a mashup including a relationship API, wherein the relationship API is as described above. Also, one or more embodiments provide a system, method, device, and/or computer readable storage medium which comprises: providing a mashup including a security API, wherein the security API is as described above. Also, one or more embodiments provides for capturing, inferring, and/or navigating dependencies between mashups and their data sources and consumers, wherein the dependencies are expressed in a relationship API and/or a security API.

It should be noted that the term "computer system" used herein denotes a device sometimes referred to as a computer, laptop, personal computer, personal digital assistants, personal assignment pads, or equivalents thereof provided such units are arranged and constructed for operation with a mashup or service.

Furthermore, the communication networks of interest include those that transmit information in packets, for example, those known as packet switching networks that transmit data in the form of packets, where messages can be packetized and routed over network infrastructure devices to a destination. Such networks include, by way of example, the Internet, intranets, local area networks (LAN), wireless LANs (WLAN), wide area networks (WAN), and others, and can be supported by networking protocols such as TCP/IP (Transmission Control Protocol/Internet Protocol) and UDP/UP (Universal Datagram Protocol/Universal Protocol) and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
   a memory; and
   a processor cooperatively operable with the memory, and configured to, based on instructions stored in memory:
   determine, for a mashup, at a first level and then recursively at subsequent levels to a predetermined number, all of the different services external to the mashup which are used by the mashup, and all mashups which are external to the mashup which are used by the mashup, as underlying data sources, such that all underlying data sources of data used by the mashup are determined,
     wherein the underlying data sources are those which directly provide data consumed by the mashup and those which provide data, via an intervening mashup or service, which is consumed by the mashup;
   determine, for each of the underlying data sources, whether a user who executes the mashup is permitted to use the underlying data source, according to a security profile of the underlying data source, and indicate an authorization failure when the user is not determined to be permitted to use at least one of the underlying data sources according to the security profile of the underlying data source, wherein the user of the mashup has permission to execute the mashup;
   when the authorization failure is indicated, refuse execution of the mashup even though the user has permission to execute the mashup; and
   when the authorization failure is not indicated, permit execution of the mashup;
   responsive to a request to dispose of a selected mashup in a mashup server, introspect the mashup to determine whether the selected mashup is connected in a "used by" relationship, directly or indirectly, to at least one other mashup in the mashup server;
   when it is determined that the selected mashup is not connected in the "used by" relationship, directly or indirectly, to at least one other mashup in the mashup server, dispose of the selected mashup from the mashup server; and
   when it is not determined that the selected mashup is connected in the "used by" relationship, directly or indirectly, refuse to dispose of the selected mashup from the mashup server.

2. The computer system of claim 1, further comprising a browser user interface which presents a selected mashup in a focus window, "used by" relationships of the selected mashup in a "used by" window, and "uses" relationships of the selected mashup in a "uses" window; and
   wherein the processor is configured to selectively switch the focus window to a different selected mashup in one of the "used by" window or the "uses" window, in response to a user command thereto.

3. The computer system of claim 2, further comprising storing a list of services and mashups used by each mashup in a database, and using the database to browse from the selected mashup or service to the mashup assets one level removed.

4. The computer system of claim 1, further comprising introspecting a mashup to discover data sources directly and indirectly used by the mashup.

5. A mashup system comprising the computer system of claim 1 acting as a mashup client, and a separate mashup server cooperatively connected to and in communication with the mashup client, to coordinate access to "consumed by" and "consumes" relationship information by the mashup client through the mashup server.

6. A non-transitory computer-readable medium storing instructions for executing the method of claim 1.

7. A computer-implemented method, implemented on a computer system, for navigating mashup dependencies, comprising:
  determining, at a processor, for a mashup, at a first level and then recursively at subsequent levels to a predetermined number, all of the different services external to the mashup which are used by the mashup, and all mashups which are external to the mashup which are used by the mashup, as underlying data sources, such that all underlying data sources of data used by the mashup are determined,
  wherein the underlying data sources are those which directly provide data consumed by the mashup and those which provide data, via an intervening mashup or service, which is consumed by the mashup;
  determining, by the processor, for each of the underlying data sources, whether a user who executes the mashup is permitted to use the underlying data source, according to a security profile of the underlying data source, and indicating an authorization failure when the user is not determined to be permitted to use at least one of the underlying data sources according to the security profile of the underlying data source, wherein the user of the mashup has permission to execute the mashup;
    when the authorization failure is indicated, refusing execution by the processor of the mashup even though the user has permission to execute the mashup; and
    when the authorization failure is not indicated, permitting execution by the processor of the mashup;
  responsive to a request to dispose of a selected mashup in a mashup server, introspecting, by the processor, the mashup to determine whether the selected mashup is connected in a "used by" relationship, directly or indirectly, to at least one other mashup in the mashup server;
    when it is determined that the selected mashup is not connected in the "used by" relationship, directly or indirectly, to at least one other mashup in the mashup server, disposing, by the processor, of the selected mashup from the mashup server; and
    when it is not determined that the selected mashup is connected in the "used by" relationship, directly or indirectly, refusing, by the processor, to dispose of the selected mashup from the mashup server.

8. The method of claim 7, further comprising providing a browser user interface which presents a selected mashup in a focus window, "used by" relationships of the selected mashup in a "used by" window, and "uses" relationships of the selected mashup in a "uses" window; and
  selectively switching the focus window to a different selected mashup in one of the "used by" window or the "uses" window, in response to a user command thereto.

9. The method of claim 8, further comprising storing a list of services and mashups used by each mashup in a database, and using the database to browse from the selected mashup or service to the mashup assets one level removed.

10. The method of claim 7, further comprising introspecting a mashup to discover data sources directly and indirectly used by the mashup.

11. A non-transitory computer-readable medium comprising instructions for execution by a computer, the instructions including a computer-implemented method for navigating mashup dependencies, the instructions for implementing:
  determining, for a mashup, at a first level and then recursively at subsequent levels to a predetermined number, all of the different services external to the mashup which are used by the mashup, and all mashups which are external to the mashup which are used by the mashup, as underlying data sources, such that all underlying data sources of data used by the mashup are determined,
  wherein the underlying data sources are those which directly provide data consumed by the mashup and those which provide data, via an intervening mashup or service, which is consumed by the mashup;
  determining, for each of the underlying data sources, whether a user who executes the mashup is permitted to use the underlying data source, according to a security profile of the underlying data source, and indicating an authorization failure when the user is not determined to be permitted to use at least one of the underlying data sources according to the security profile of the underlying data source, wherein the user of the mashup has permission to execute the mashup;
    when the authorization failure is indicated, refusing execution of the mashup even though the user has permission to execute the mashup; and
    when the authorization failure is not indicated, permitting execution of the mashup;
  responsive to a request to dispose of a selected mashup in a mashup server, introspecting the mashup to determine whether the selected mashup is connected in a "used by" relationship, directly or indirectly, to at least one other mashup in the mashup server;
    when it is determined that the selected mashup is not connected in the "used by" relationship, directly or indirectly, to at least one other mashup in the mashup server, disposing of the selected mashup from the mashup server; and
    when it is not determined that the selected mashup is connected in the "used by" relationship, directly or indirectly, refusing to dispose of the selected mashup from the mashup server.

12. The computer-readable medium of claim 11, further comprising providing a browser user interface which presents a selected mashup in a focus window, "used by" relationships of the selected mashup in a "used by" window, and "uses" relationships of the selected mashup in a "uses" window; and
  selectively switching the focus window to a different selected mashup in one of the "used by" window or the "uses" window, in response to a user command thereto.

13. The computer-readable medium of claim 12, further comprising storing a list of services and mashups used by each mashup in a database, and using the database to browse from the selected mashup or service to the mashup assets one level removed.

14. The computer-readable medium of claim 11, further comprising introspecting a mashup to discover data sources directly and indirectly used by the mashup.

* * * * *